(12) United States Patent
Moniz et al.

(10) Patent No.: US 11,138,244 B2
(45) Date of Patent: *Oct. 5, 2021

(54) DETECTION AND VISUALIZATION OF GEOGRAPHIC DATA

(71) Applicant: International Business Machines Corporation, Armonk, NY (US)

(72) Inventors: Michael J. Moniz, Ottawa (CA); Yvon R. Nonez, Orleans (CA); Claudiu D. Popescu, Ottawa (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 16/216,125

(22) Filed: Dec. 11, 2018

(65) Prior Publication Data

US 2019/0108180 A1   Apr. 11, 2019

Related U.S. Application Data

(63) Continuation of application No. 15/255,593, filed on Sep. 2, 2016, now Pat. No. 10,296,600.

(51) Int. Cl.
*G06F 16/29* (2019.01)
*G06F 16/904* (2019.01)
*G06F 16/903* (2019.01)

(52) U.S. Cl.
CPC ............ *G06F 16/29* (2019.01); *G06F 16/904* (2019.01); *G06F 16/90335* (2019.01)

(58) Field of Classification Search
None
See application file for complete search history.

(56) References Cited

U.S. PATENT DOCUMENTS

| | | | |
|---|---|---|---|
| 8,655,983 B1 * | 2/2014 | Harris | H04L 67/18 709/217 |
| 8,719,259 B1 * | 5/2014 | Zhang | G06Q 20/405 707/722 |
| 9,009,177 B2 * | 4/2015 | Zheng | G06F 16/9537 707/758 |
| 9,104,695 B1 | 8/2015 | Cervelli et al. | |

(Continued)

FOREIGN PATENT DOCUMENTS

WO   2016007162 A1   1/2016

OTHER PUBLICATIONS

List of IBM Patents or Patent Applications Treated as Related, Dec. 2018, 1 page.

*Primary Examiner* — Christopher J Raab
(74) *Attorney, Agent, or Firm* — Steven Bouknight; Edell, Shapiro & Finnan, LLC (57) ABSTRACT

Identifying and visualizing geographic data includes obtaining a set of data including candidate geographic data elements. Metrics are determined based on two or more of: a best parent for the candidate geographic data elements; additional concepts associated with the candidate geographic data elements; and an average distance between the candidate geographic data elements. Then, the candidate geographic data elements are identified as geographic based on the metrics and a map is generated displaying the candidate geographic data elements identified as geographic.

20 Claims, 5 Drawing Sheets

(56) References Cited

U.S. PATENT DOCUMENTS

| | | | |
|---|---|---|---|
| 2008/0183498 A1* | 7/2008 | Nichols | G06Q 10/06316 705/2 |
| 2009/0106105 A1* | 4/2009 | Lewis | G06Q 30/02 705/14.69 |
| 2009/0319556 A1* | 12/2009 | Stolte | G09B 29/00 |
| 2012/0023085 A1* | 1/2012 | Bellerive | G06F 16/9535 707/706 |
| 2012/0117007 A1* | 5/2012 | Agrawal | G06F 16/29 706/12 |
| 2013/0060764 A1* | 3/2013 | Voinea | G06F 16/29 707/723 |
| 2013/0111315 A1 | 5/2013 | Mendelovich et al. | |
| 2014/0164415 A1* | 6/2014 | Duleba | G06F 16/29 707/758 |
| 2016/0232537 A1* | 8/2016 | Nonez | G06Q 10/0633 |
| 2016/0358295 A1* | 12/2016 | Heffley | G06Q 50/24 |
| 2017/0161358 A1* | 6/2017 | Tadeski | G06F 16/221 |
| 2017/0270082 A1* | 9/2017 | Marshall | G06F 3/0482 |
| 2018/0067965 A1 | 3/2018 | Moniz et al. | |
| 2018/0095994 A1 | 4/2018 | Moniz et al. | |

\* cited by examiner

DETECTION AND VISUALIZATION OF GEOGRAPHIC DATA

CROSS-REFERENCE TO RELATED APPLICATIONS

This application is a continuation of U.S. patent application Ser. No. 15/255,593, entitled "DETECTION AND VISUALIZATION OF GEOGRAPHIC DATA" and filed Sep. 2, 2016, the disclosure of which is incorporated herein by reference in its entirety.

BACKGROUND

Present invention embodiments relate to data processing systems, and more specifically, to techniques for identifying and visualizing geographic data with data processing systems.

Geographic data is widely utilized and can be incredibly valuable. For example, with the rise of cloud computing systems, mobile connectivity, and other technology that allows users to remain connected while at different locations or on the move, geographic data may allow different systems to provide services based on the geographic location of a user. However, it is surprisingly difficult to identify a set of data as geographic, especially when a dataset is a string of text, without metadata, unambiguous labels, or other such data that might signify what type of data is included in the data set. For example, in IBM® WATSON ANALYTICS™, users can upload large or small amounts of data in order to visualize their data; however, the data may be uploaded as a comma separated values (CSV) file without any metadata identifying the data included therein and, thus it may be difficult to identify geographic data included therein. This is exacerbated when the geographic data is geographic data from a lower level in a geographic hierarchy, such as cities, towns, or even counties, as opposed to countries or states. For example, counties in the United States may be named Jefferson, Davis, Montgomery, and other such names that may also be common family names (e.g., last names) in the United States.

SUMMARY

According to one embodiment of the present invention, identifying and visualizing geographic data includes obtaining a set of data including candidate geographic data elements. Metrics are determined based on two or more of: a best parent for the candidate geographic data elements; additional concepts associated with the candidate geographic data elements; and an average distance between the candidate geographic data elements. Then, the candidate geographic data elements are identified as geographic based on the metrics and a map is generated displaying the candidate geographic data elements identified as geographic.

BRIEF DESCRIPTION OF THE DRAWINGS

Generally, like reference numerals in the various figures are utilized to designate like components.

DETAILED DESCRIPTION

Presented herein are techniques for identifying or detecting geographic data and visualizing the identified geographic data. Generally, the techniques provided herein utilize a unique combination of tests in order to identify data from a data set, such as a structured data set, as geographic data with a high degree of accuracy. Then, the identified data can be displayed on a map in order to visualize the data. The techniques determine the likelihood that candidate data elements included in the data set represent geographic elements by focusing on a best parent of the candidate elements, distances between the candidate elements, and the number of other concepts that may be associated with the candidate elements. As is described in more detail below, the best parent may be a geographic element that covers a substantial subset of the candidate elements, thereby revealing similarities in the candidate data elements. When the best parent is used in combination with the average distance and number of other concepts, geographic data may be identified with a high degree of accuracy, thereby allowing applications or processes utilizing geographic data to function more efficiently. For example, accurately identifying geographic data allows data to be properly visualized (e.g., on a map).

Without these techniques, approaches may be required to rely on labels or tags included in a data set, which is often ineffective since data may be labeled with customized or internally understood labels, as opposed to standardized labels. For example, a user could enter an acronym column name, such as columnName="MUCN," where MUCN stood for "My User's County Name," and this column name may be unidentifiable without an explanation of the acronym. Moreover, many data sets are often unlabeled. To address this, other alternative approaches may analyze metadata or a dictionary; however, this may also experience issues with unidentifiable labels or unlabeled data, may be inefficient in terms of both time and resources, and/or may be inaccurate.

Figure 1:
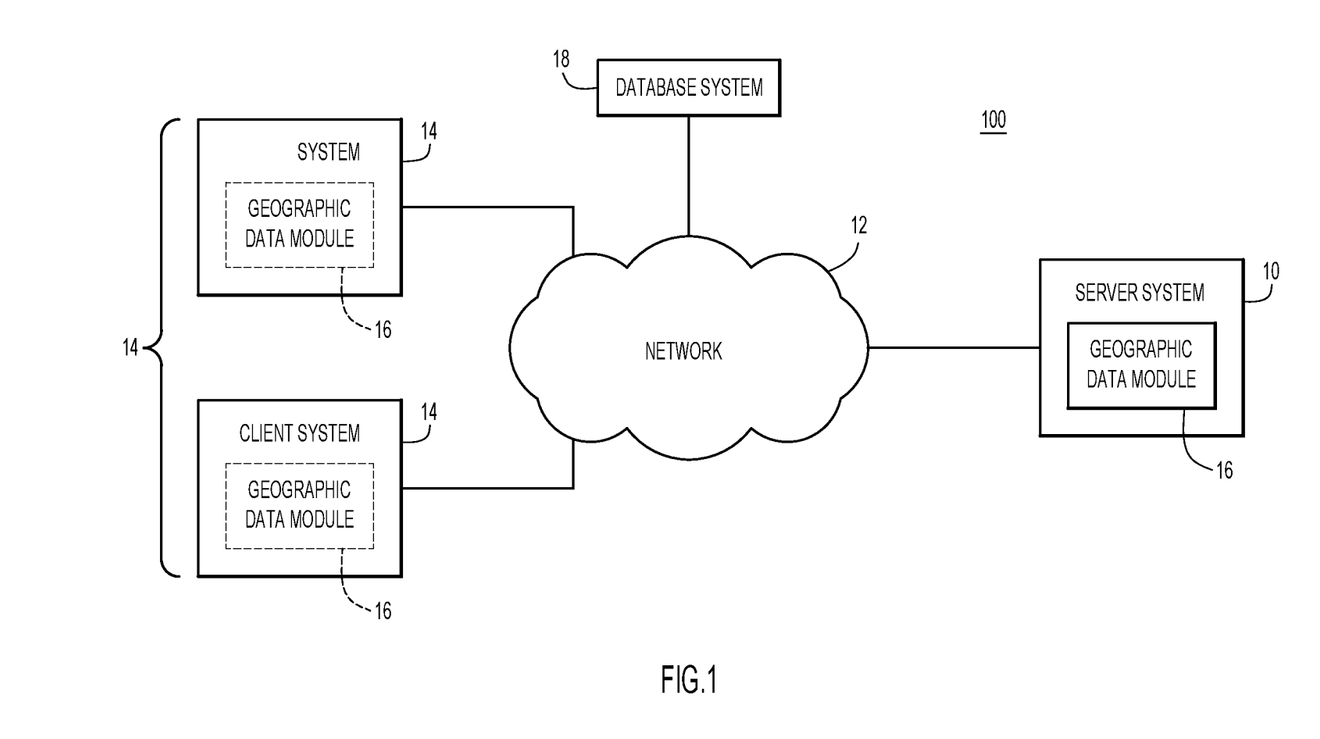
FIG. 1 illustrates an example environment in which the present general inventive concept can be embodied.

An example environment for use with present invention embodiments is illustrated in FIG. 1. Specifically, the environment includes one or more server systems 10, and one or more client or end-user systems 14. The server systems 10 and client systems 14 are each described in further detail below in connection with FIG. 6; however, generally, server systems 10 and client systems 14 may be remote from each other and communicate over a network 12. The network 12 may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

In the present invention embodiment depicted in FIG. 1, the server system 10 includes a geographic data module 16; however, as shown in dashed lines, in other embodiments, the geographic data module 16 may also be disposed, either entirely or partially, on the client systems 14. Geographic data module 16 may include one or more modules or units to perform the various functions of present invention embodiments. As is described in further detail below, the geographic data module 16 is generally configured to identify and visualize geographic data included in a data set. In at least some embodiments, the client systems 14 may present a graphical user interface (e.g., GUI, etc.) or other such user interface to allow a user to upload a set of data to the server systems 10 so that geographic data can be identified and visualized.

Still referring to FIG. 1, the network environment 100 may also include a database system 18 that may store various information for the geographic data module 16 (e.g., map data, map rendering instructions, etc.). The database system 18 may be implemented by any conventional or other system, such as a database or storage unit, may be local to or remote from server systems 10 and client systems 14, and may communicate via any appropriate communication medium (e.g., local area network (LAN), wide area network (WAN), Internet, hardwire, wireless link, Intranet, etc.).

Figure 2:
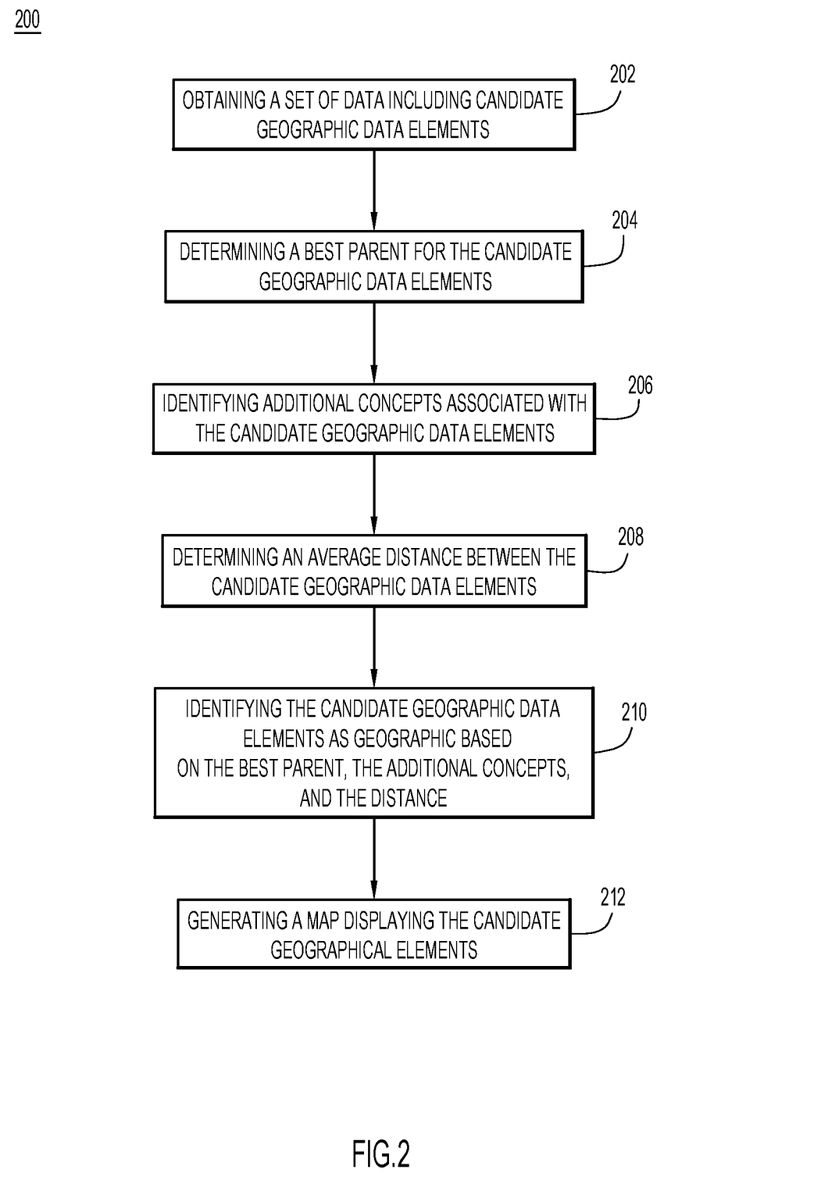
FIG. 2 is a procedural flow chart of identifying and visualizing geographic data, according to a present invention embodiment.

With reference now to FIG. 2, procedural flow chart 200 depicts operations (e.g., of geographic data module 16) for identifying or detecting geographic data and visualizing the identified geographic data. Initially, at step 202, a set of data including candidate geographic data elements (also referred to herein as candidate elements, candidate data objects, etc.) is obtained. For example, a client system may send a data set to a server system upon which the geographic data module 16 is residing. In at least some embodiments, the data set is a structured data set, such that the input data has column names and a set of values. For example, a data set may include a table with a first column for a state and a second column for counties, such as the following:

| | |
|---|---|
| Alabama | Hale |
| Alabama | Henry |
| Alabama | Houston |
| Alabama | Jackson |
| Alabama | Jefferson |
| Alabama | Lamar |
| Alabama | Laurderdale |
| Alabama | Lawrence |
| Alabama | Lee |
| Alabama | Limestone |
| Alabama | Lowndes |
| Alabama | Macon |
| Alabama | Madison |
| Alabama | Marengo |
| Alabama | Marion |
| Alabama | Marshall |

In this particular example, the candidate geographic data elements are the strings included in the right column, but generally, the candidate geographic data elements may be any sub-elements within a data set. The strings or sub-elements are identified as candidate geographic data elements using textual analysis, such as by utilizing pattern matching to identify particular strings (e.g., lemmas and/or stems) and cross-referencing the identified strings with a set of known geographic terms (e.g., an established ontology or taxonomy of geographic terms). Additionally or alternatively, if the set of data includes labels, the labels may be analyzed in a similar manner. Put another way, data in a set of data may be analyzed with a set of textual analysis rules to identify candidate geographic data elements.

As an example, if the table above is analyzed with textual analysis, both columns may be determined to be candidate geographic data elements. In fact, a simple ontology might be able to easily determine that the data set is providing a concept of counties within a state (Alabama); however, this table is merely an example and, in other embodiments, the data set received may not indicate that the data is geographic data so clearly. For example, if another data set (e.g., a CSV file) only includes the following data: "Hale, Henry, Houston, Jackson, Jefferson, Lawrence, Lee," (without a state column or any metadata) it may be unclear if the data is geographic data or names. As another example, if a data set includes the data element "Georgia" or the data element "Montgomery" without obvious context, it be unclear as to whether the data element is referring to state, country, peach type, or name (e.g., for Georgia), a city, county, name, street, etc. (e.g., for Montgomery), or some other entity. This becomes exponentially difficult as the geographic data refers to lower hierarchies (e.g., counties, cities, or even street names).

As is described in further detail below, the techniques presented herein resolve these issues once a data set is obtained at step 202 by analyzing a number of metrics associated with candidate data elements. The techniques provided herein can identify candidate geographic data elements at any level of a geographic hierarchy (e.g., as low as street addresses and as high as continents) and consider any desirable geographic field, ranging from postal codes, to regions, to provinces, to prefectures. In fact, in some embodiments, different hierarchies from different countries may be conflated in order to standardize geographic data over the globe. For example, provinces in Canada may be equated to states in the United States and regions in the United Kingdom (e.g., England, Scotland, etc.).

At step 204, a best parent is determined for candidate geographic data elements. The best parent is a data element that encompasses or describes the most sub-elements determined to be candidate geographic data elements. In some embodiments, the best parent may be determined by identifying an element with the best coverage of sub-elements within the data. Additionally or alternatively, a best parent may be determined by identifying or locating a parent element in the data. For example, in the data set included in the table above, 'Alabama' may be the best parent because it has a parent relationship with each piece of data included in the right column and because it covers every sub-element included in the right column. Alternatively, if the data set includes a column with values that are all clearly sub-elements of a particular parent, this parent may be identified by consulting a geographic resource or built in intelligence (even though the parent is not explicitly included in the data set). For example, if the data set above was received without the first column, analysis may determine that all of the data elements in the second column are counties in Alabama and, thus, Alabama may be determined to be the best parent.

Moreover, in some embodiments, best parents may be found with recursive behavior to increase the confidence level of a geographic data determination. For example, counties can be checked against states which can be checked against a country, and so forth. Since it is usually easier to identify data as geographic data higher up in a geographic hierarchy (e.g., states and countries typically have less overlap with commonly used words or names), identifying a geographic best parent higher in a hierarchy may provide increased confidence that the candidate geographic data elements are indeed geographic data elements. For example, if an identified best parent state/province includes all of the candidate geographic data elements (e.g., county names); the candidate geographic data elements may be likely to actually be geographic data elements.

At step 206, additional concepts associated with the candidate geographic data elements may be identified. Specifically, non-geographic concepts associated with the candidate geographic data elements may be identified so that other possible meanings of the candidate geographic data elements may be considered. For example, if a data set includes John, Jefferson, and Georgia, a concept for people's names is identified as an additional concept that could describe the data. In at least some embodiments, the complete ontology of a data element is reviewed in order to determine other concepts associated with the candidate geographic data elements. In fact, in at least some embodiments, the additional concepts may not be considered unless the complete ontology is available, since an incomplete ontology might improperly indicate that no other concepts are associated with the candidate geographic data element.

At step 208, an average geographic distance between the candidate geographic data elements may be determined. The average may be a mean or weighted mean of the geographic distances between all of the candidate geographic data elements or a mean or weighted mean of the distances from each candidate geographic data element to its closest candidate geographic data element. The distance between candidate geographic data elements may be determined by measuring the distance between the latitudinal and longitudinal coordinates of the centers of two geographic areas. In some embodiments, this may be simplified by approximating each geographic area as a shape and determining the center in accordance with geometric formulas. Additionally or alternatively, the distances may be determined or adjusted in view of border locations (e.g., by analyzing GeoJSON border encodings). The borders may reveal whether two areas are bordering and, thus, may allow for a reduction of a distance to zero when two geographic areas are bordering, even if the distance between centers is measuring relatively high (which may be the case in higher geographic hierarchies). Thus, large, but adjacent geographic areas will not skew the results despite having two centers being separated by hundreds of miles (e.g., the centers of Colorado and Wyoming).

At step 210, the candidate geographic data elements can be identified as geographic data elements that should be displayed in a virtual map. The identification is based on at least one of the best parent, the additional concepts, and the average distance (e.g., at least one of the metrics discussed above). In fact, in at least some embodiments, all three metrics are considered in order to ensure accuracy. Each of the metrics determined in steps 204, 206, and 208 may be negatively or positively correlated with the candidate geographic data elements being geographic and may be weighted or considered in any manner. In at least some embodiments, each of these metrics may be scored or numerically represented and aggregated in order to determine a likelihood score, as is described in more detail below with regards to FIGS. 3 and 4. Then, when the likelihood score is above a certain threshold, candidate geographic data elements may be identified as geographic.

Generally, different metrics may be determined in connection with the best parent and each of the different metrics may have a different correlation, as is described in more detail in connection with FIGS. 3 and 4. By comparison, the number of additional concepts associated with the candidate geographic data elements is negatively correlated with the candidate geographic data elements being geographic and, thus, additional identified concepts may decrease the chance of candidate geographic data elements being geographic (thereby decreasing the likelihood that an accurate visualization should depict these elements on a map).

Similarly, the average geographic distance between candidate geographic data elements may also be negatively correlated with the candidate geographic data elements being geographic so that a larger average geographic distance decreases the chance of candidate geographic data elements being geographic. The average distance may have a negative correlation because when larger distances exist between elements, the elements are less likely to be useful when displayed on a map (e.g., the richness of a map may increase when focused on a smaller overall area). For example, if three counties within Texas are identified, the subsequent map would only need to cover a portion of Texas, but if one county in USA, one county in Thailand, and one county in Brazil are identified, the subsequently generated map would need to show nearly the entire globe and would not be able to provide much detail in any of the identified locations. It is also less likely that a set of data includes widely dispersed geographic data (and more likely that closely situated geographic elements are included in the same data set).

At step 212, candidate geographic data elements that have been identified as geographic are visualized. In particular, a map including the candidate elements is generated and displayed. In some embodiments, generating a map may involve generating display layers for the candidate geographic data elements and overlaying the generated display layers onto a base map. The map may focus on the particular region or regions that are covered by the candidate elements and, thus, may quickly provide a user with a useful view of geographic data. A generated map may also show any desirable details of a covered area, such as roadways, a satellite view, traffic patterns, etc. Moreover, since the techniques provided herein remove false positives, data that resembles geographic data, but is not in fact geographic data will not be visualized in a mapped environment, which might be confusing or unhelpful. In other words, the techniques provided herein may improve computer processing speed and efficiency (e.g., in terms of time) by only processing those data sets that include geographic data elements for display on a map.

Figure 3:
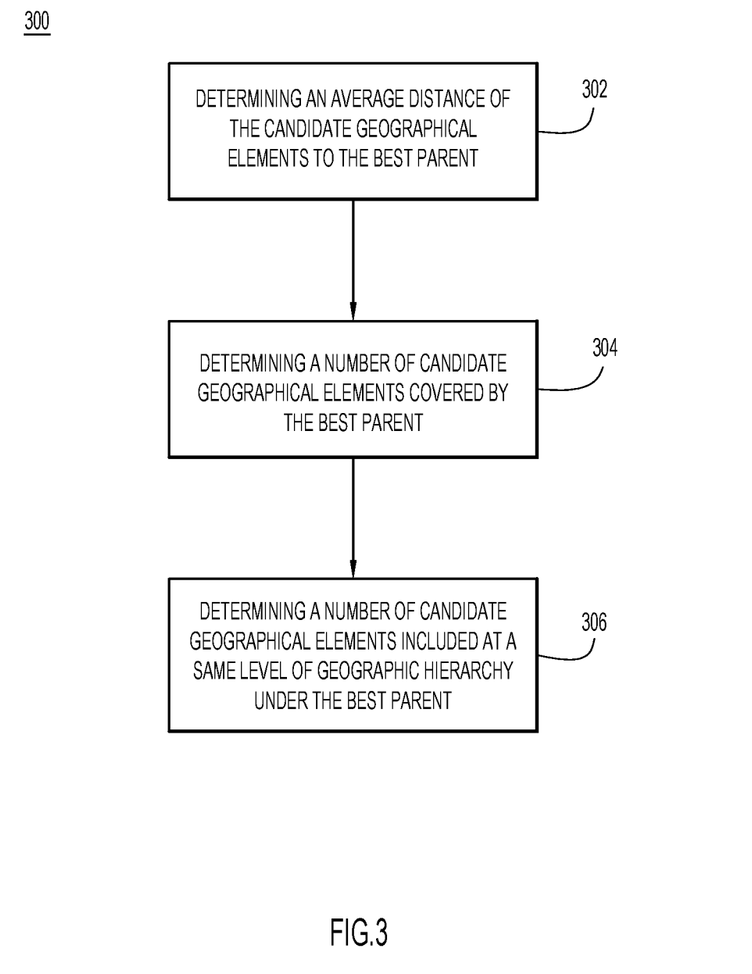
FIG. 3 is a procedural flow chart illustrating operations for utilizing a best parent to identify geographic data, according to a present invention embodiment.

Now referring to FIG. 3, procedural flow chart 300 depicts operations (e.g., of geographic data module 16) for identifying geographic data based on the best parent. At step 302, an average hierarchal distance to the parent may be determined. The hierarchal distance may measure or count the number of levels between the candidate geographic data elements and the best parent. For example, if a data set includes a few counties in the United States, one county (or equivalent geographic structure) in Germany, and one county (or equivalent geographic structure) in China, the common parent would be the Earth because the data is spread over different countries and continents {North America, Europe, Asia} and the parent may separated from the candidate geographic data elements by three levels (e.g., counties to states, to countries to continents to Earth). Similar to the average geographic distance between candidate geographic data elements, this distance negatively correlates with the candidate geographic data elements being geographic. This is at least because it may not be useful to present a user with a map that, by default, shows large expanses that are hierarchaly distant from the candidate geographic data elements. As a specific example, in the example above, every single county in the world would need to be mapped to show all of the candidate geographic data elements, even though only five or six counties have data. In other words, this data would have a representation of 5/TOTAL_NUM_OF_COUNTIES_WORLD, which is essentially 0% and, thus, would be unlikely to be helpful if visualized in a map.

At step 304, coverage of the best parent can be determined. The coverage relates to how many elements from the candidate geographic data elements are associated with the best parent. As is described in further detail below, this metric may be positively correlated with candidate geographic data elements being geographic so that a best parent covering more candidate geographic data elements tends to show that the candidate geographic data elements are geographic and should be displayed in a map. For example, if a subset includes one or two counties from five different states in the USA, this may suggest that the data could be about one to one with respective parents in the next highest hierarchy (e.g., states). By comparison, if the data set includes one or two states with five counties each, each parent in the next highest hierarchy (e.g., states) may have wider coverage and this would provide more confidence that the data set is representing counties (as opposed to being a list of names that happens to correlate similarly to county names in different states).

At step 306, a number of candidate geographic data elements included at a same level of geographic hierarchy under the best parent may be determined. In other words, if the best parent is a state that covers 15 candidate geographic data elements, it is determined how many of these candidate geographic data elements are counties within the state, how many are cities within the state, and so forth. As is described in further detail below, this metric may be positively correlated with candidate geographic data elements being geographic so that a best parent with more candidates in the same hierarchy tends to show that the candidates are geographic. This is at least because as the number of candidate geographic data elements in a specific hierarchy grows, the harder it becomes to find additional elements in the same hierarchy. Consequently, it is less likely that the candidate geographic data elements are not geographic as more elements are found within the same hierarchy.

Figure 4:
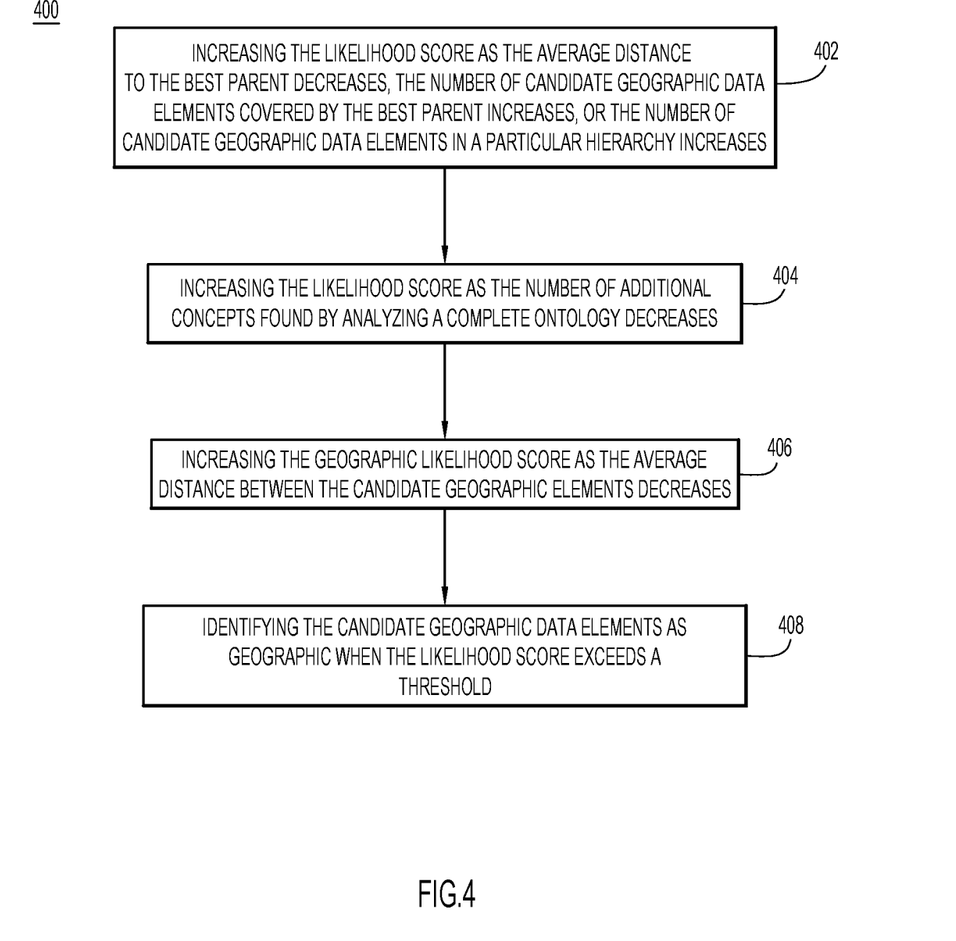
FIG. 4 is a procedural flow chart illustrating operations for determining a likelihood score to identify geographic data, according to a present invention embodiment.

Now referring to FIG. 4, procedural flow chart 400 depicts operations (e.g., of geographic data module 16) for determining a likelihood score. The likelihood score represents the likelihood that the candidate geographic data elements are geographic. As mentioned above, the best parent can impact the likelihood score in a number of manners. Consequently, at step 402, the likelihood score may be increased as the average distance to the best parent decreases (since this metric is negatively correlated with the candidate geographic data elements being geographic), the number of candidate geographic data elements covered by the best parent increases (since this metric is positively correlated with the candidate geographic data elements being geographic), or the number of candidate geographic data elements in a particular hierarchy increases (since this metric is positively correlated with the candidate geographic data elements being geographic).

At step 404, the likelihood score may be increased as the number of additional concepts found by analyzing the complete ontology decreases. This is at least because the number of additional concepts found is negatively correlated with the candidate geographic data elements being geographic. Finally, at step 406, the likelihood score may be increased as the distance between the candidate geographic data elements decreases since the distance between candidates is negatively correlated with the candidate geographic data elements being geographic.

More specifically, in at least some embodiments, each of the aforementioned elements may be defined numerically by the following equations:

The average coverage of the parent element may be represented as A and defined as a real number (R) between 0 and 1, per $\{A | A \in R \text{ and } A \in [0, 1]\}$, so that A defines the percentage of candidate elements covered by the best parent.

The average distance to the best parent may be represented as B and defined as a natural number (positive integer) between as 0 and 6, per $\{B | B \in N \text{ and } B \in [0, 6]\}$. In some embodiments, this range may represent seven level of geographic hierarchy minus the existing level. However, if the depth of the geography considered is altered, this range may be altered accordingly.

The count of recognizable geographic elements at the same level may be represented as C and defined as a natural number between 1 and X, where X represents the total number of rows included in the data set, per $\{C | C \in N \text{ and } C \in [1, X]\}$, so that C is a count that cannot exceed the number of rows.

The distance between the candidate geographic data elements may be represented as D and may be a real number greater than 0, per $\{D | D \in R \text{ and } D > 0\}$. For example, D may be a distance between elements in kilometers.

The number of additional concepts associated with the candidate geographic data elements may be represented as E and may be a positive integer, per $\{E | E \in N\}$.

Moreover, in at least some embodiments, the number of rows may also be considered when determining the likelihood score since the number of rows provides context for the data. As mentioned above, the number of rows may be represented as X and may be any positive integer, per $\{X | X \in N\}$.

Once a score is determined for each of the aforementioned metrics or elements (e.g., for A, B, C, D, E, and X), the score for each metric or element may be weighted in an aggregation formula to determine a likelihood score, such as the following formula:

$$likelihood_{score} = \frac{A + \frac{C}{X}}{(B+1) * D * E}$$

Notably, the negatively correlated elements (B, D, and E) are included on the bottom of the formula, while positively correlated elements (A and C) are included at the top of the formula.

Once this aggregated likelihood score is determined, it may be compared, at step 408, to a threshold. If the score is above the threshold, the candidate geographic data elements may be considered to be geographic. The threshold may be a predetermined threshold determined based on testing or a dynamic threshold determined based on running averages and other such factors. However, the threshold should be high enough to accurately determine when candidate data elements are geographic. That being said, in some embodiments, if one of the factors score very low, it may be possible to dump or ignore this factor (e.g., consider it an outlier), especially if the other factors provide high confidence. For example, if a high number of additional concepts are identified, but every other factor indicates that the data is geographic, the additional concepts may be ignored and the candidate geographic data elements may be considered geographic if desired.

Referring generally to FIG. 4, in some embodiments, scores may be determined for any data objects or group of data objects determined to be candidate geographic objects. Alternatively, the number of operations may be reduced by first determining scores for column names or labels (if they exist) and only subsequently analyzing candidate geographic data elements when an associated column name or label is determined to be geographic (e.g., when the likelihood score for a column or label satisfies the threshold). Additionally or alternatively, data elements may be filtered with any other method, such as imperfect ontologies that sometimes produce false positives, before being analyzed with the techniques presented herein (e.g., before a likelihood score is calculated).

Figure 5:
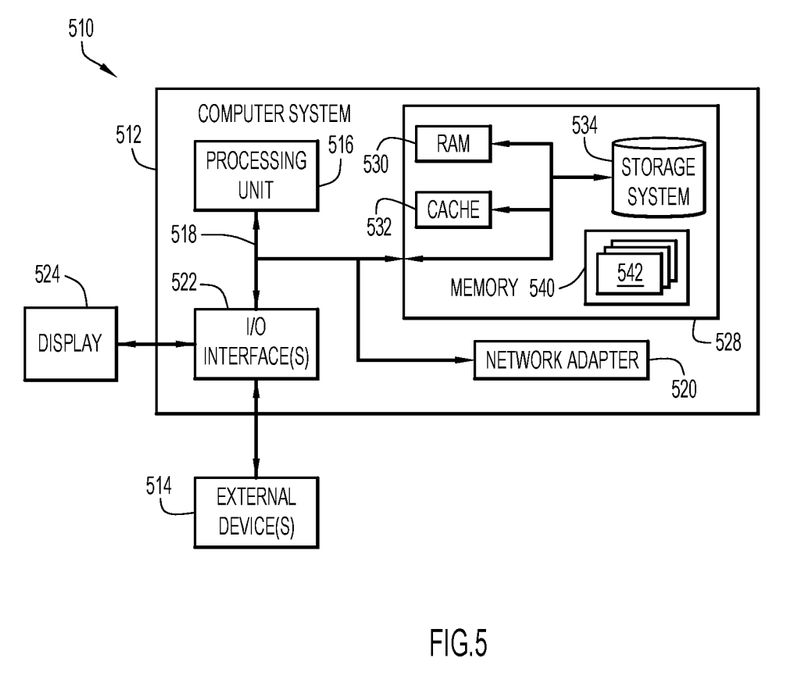
FIG. 5 is a block diagram of a computing node according to an embodiment of the present invention.

Referring now to FIG. 5, a schematic of an example of a computing node or device 510 for computer environment 100 (e.g., server systems 10 and client systems 14, etc.) is shown. The computing node or device 510 is only one example of a suitable computing node for computing environment 100 and is not intended to suggest any limitation as to the scope of use or functionality of embodiments of the invention described herein. Regardless, computing node 510 is capable of being implemented and/or performing any of the functionality set forth herein.

In computing node 510, there is a computer system 512 which is operational with numerous other general purpose or special purpose computing system environments or configurations. Examples of well-known computing systems, environments, and/or configurations that may be suitable for use with computer system 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 512 may be described in the general context of computer system executable instructions, such as program modules, being executed by a computer system. Generally, program modules may include routines, programs, objects, components, logic, data structures, and so on that perform particular tasks or implement particular abstract data types. Computer system 512 may be practiced in distributed cloud computing environments where tasks are performed by remote processing devices that are linked through a communications network. In a distributed cloud computing environment, program modules may be located in both local and remote computer system storage media including memory storage devices.

In FIG. 6, computer system 512 is shown in the form of a general-purpose computing device. The components of computer system 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 512 typically includes a variety of computer system readable media. Such media may be any available media that is accessible by computer system 512, and it includes both volatile and non-volatile media, removable and non-removable media.

System memory 528 can include computer system readable media in the form of volatile memory, such as random access memory (RAM) 530 and/or cache memory 532. Computer system 512 may further include other removable/non-removable, volatile/non-volatile computer system storage media. By way of example only, storage system 534 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 (e.g., including geographic data module 16) generally carry out the functions and/or methodologies of embodiments of the invention as described herein.

Computer system 512 may also communicate with one or more external devices 514 such as a keyboard, a pointing device, a display 524, etc.; one or more devices that enable a user to interact with computer system 512; and/or any devices (e.g., network card, modem, etc.) that enable computer system 512 to communicate with one or more other computing devices. Such communication can occur via Input/Output (I/O) interfaces 522. Still yet, computer system 512 can communicate with one or more networks such as a local area network (LAN), a general wide area network (WAN), and/or a public network (e.g., the Internet) via network adapter 520. As depicted, network adapter 520 communicates with the other components of computer system 512 via bus 518. It should be understood that although not shown, other hardware and/or software components could be used in conjunction with computer system 512. Examples, include, but are not limited to: microcode, device drivers, redundant processing units, external disk drive arrays, RAID systems, tape drives, and data archival storage systems, etc.

The techniques provided herein have a number of advantages. As one example, the combination of factors considered to make a determination as to whether a candidate geographic data element is geographic may reduce false positives and provide confidence when mapping geographic data. This may be beneficial for the plethora of applications that are not utilizing location information, since false positives (e.g., non-geographic data identified as geographic) are reduced. Moreover, for data analysis and visualization, the techniques presented herein may ensure that data is visualized in the most useful manner. More generally, the techniques provided herein resolve a problem that is rooted in computer technology by resolving computerized data analysis issues with recognizing geographic data. Without these techniques, non-geographic data may be identified as geographic which may cause subsequent issues with analysis, visualization, and other such operations. For example, family names might be incorrectly displayed on a map during data visualization.

It will be appreciated that the embodiments described above and illustrated in the drawings represent only a few of the many ways of implementing embodiments for identifying and virtualizing geographic data.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, geographic data module, etc.). These systems may include any types of monitors and input devices (e.g., keyboard, mouse, voice recognition, etc.) to enter and/or view information.

It is to be understood that the software (e.g., geographic data module 16) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., geographic data module 16) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., likelihood scores and formulas, map data, and other geographic information, etc.). The database system may be implemented by any number of any conventional or other databases, data stores or storage structures (e.g., files, databases, data structures, data or other repositories, etc.) to store information (e.g., likelihood scores and formulas, map data, and other geographic information, etc.). The database system may be included within or coupled to the server and/or client systems. The database systems and/or storage structures may be remote from or local to the computer or other processing systems, and may store any desired data (e.g., likelihood scores and formulas, map data, and other geographic information, etc.).

The present invention embodiments may employ any number of any type of user interface (e.g., Graphical User Interface (GUI), command-line, prompt, etc.) for obtaining or providing information (e.g., for submitting a data set or receiving a displayed map.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touchscreen, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of identifying and visualizing geographic data comprising:
   obtaining a set of data including candidate geographic data elements;
   determining metrics based on a best parent for the candidate geographic data elements, additional non-geographic concepts associated with the candidate geographic data elements from one or more ontologies of the candidate geographic data elements, and an average geographic distance between the candidate geographic data elements, wherein the best parent includes a greatest quantity of parent relationships in a geographic hierarchy with other candidate geographic data elements;
   identifying the candidate geographic data elements as geographic based on the metrics, wherein identifying the candidate geographic data elements includes:
      generating a likelihood score based on the best parent, the additional non-geographic concepts, and the average geographic distance between the candidate geographic data elements;
      increasing the likelihood score as a number of candidate geographic data elements covered by the best parent increases, as a number of the additional non-geographic concepts decreases, and as the average geographic distance between the candidate geographic data elements decreases; and
      identifying the candidate geographic data elements as geographic when the likelihood score exceeds a threshold; and
   generating a map displaying the candidate geographic data elements identified as geographic.

2. The computer-implemented method of claim 1, wherein generating the likelihood score comprises:
   generating the likelihood score based on an aggregation of a score associated with the best parent, a score associated with the additional non-geographic concepts, and a score associated with the average geographic distance.

3. The computer-implemented method of claim 2, further comprising:
   determining the score associated with the best parent by analyzing the candidate geographic data elements based on one or more from a group of:
      an average distance of the candidate geographic data elements to the best parent;
      a number of candidate geographic data elements covered by the best parent; and
      a number of candidate geographic data elements included at a same level of the geographic hierarchy under the best parent,
      wherein there is a negative correlation between the likelihood score and the average distance of the candidate geographic data elements to the best parent, a positive correlation between the likelihood score and the number of candidate geographic data elements covered by the best parent, and a positive correlation between the likelihood score and the number of candidate geographic data elements included at the same level of the geographic hierarchy under the best parent.

4. The computer-implemented method of claim 2, further comprising:
   determining the score associated with the additional non-geographic concepts by analyzing a complete ontology of the candidate geographic data elements, wherein there is a negative correlation between the likelihood score and the number of additional non-geographic concepts in the complete ontology.

5. The computer-implemented method of claim 2, wherein there is a negative correlation between the likelihood score and the average geographic distance between the candidate geographic data elements.

6. The computer-implemented method of claim 2, wherein the aggregation further aggregates a score determined based on a number of rows included in the set of data.

7. The computer-implemented method of claim 1, wherein data included in the set of data is structured data that does not indicate whether the data is geographic data.

8. An apparatus for identifying and visualizing geographic data comprising:
   at least one processor configured to:
      obtain a set of data including candidate geographic data elements;
      determine metrics based on a best parent for the candidate geographic data elements, additional non-geographic concepts associated with the candidate geographic data elements from one or more ontologies of the candidate geographic data elements, and an average geographic distance between the candidate geographic data elements, wherein the best parent includes a greatest quantity of parent relationships in a geographic hierarchy with other candidate geographic data elements;
      identify the candidate geographic data elements as geographic based on the metrics, wherein identifying the candidate geographic data elements includes:
         generating a likelihood score based on the best parent, the additional non-geographic concepts, and the average geographic distance between the candidate geographic data elements;
         increasing the likelihood score as a number of candidate geographic data elements covered by the best parent increases, as a number of the additional non-geographic concepts decreases, and as the average geographic distance between the candidate geographic data elements decreases; and
         identifying the candidate geographic data elements as geographic when the likelihood score exceeds a threshold; and
      generate a map displaying the candidate geographic data elements identified as geographic.

9. The apparatus of claim 8, wherein, in generating the likelihood score, the at least one processor is configured to:
   generate the likelihood score based on an aggregation of a score associated with the best parent, a score associated with the additional non-geographic concepts, and a score associated with the average geographic distance.

10. The apparatus of claim 9, wherein, the at least one processor is further configured to:

determine the score associated with the best parent by analyzing the candidate geographic data elements based on one or more from a group of:
an average distance of the candidate geographic data elements to the best parent;
a number of candidate geographic data elements covered by the best parent; and
a number of candidate geographic data elements included at a same level of the geographic hierarchy under the best parent,
wherein there is a negative correlation between the likelihood score and the average distance of the candidate geographic data elements to the best parent, a positive correlation between the likelihood score and the number of candidate geographic data elements covered by the best parent, and a positive correlation between the likelihood score and the number of candidate geographic data elements included at the same level of the geographic hierarchy under the best parent.

11. The apparatus of claim 9, wherein the at least one processor is further configured to:
determine the score associated with the additional non-geographic concepts by analyzing a complete ontology of the candidate geographic data elements, wherein there is a negative correlation between the likelihood score and number of additional non-geographic concepts in the complete ontology.

12. The apparatus of claim 9, wherein there is a negative correlation between the likelihood score and the average geographic distance between the candidate geographic data elements.

13. The apparatus of claim 9, wherein the aggregation further aggregates a score determined based on a number of rows included in the set of data.

14. The apparatus of claim 8, wherein data included in the set of data is structured data that does not include an indication as whether the data is geographic data.

15. A computer program product for identifying and visualizing geographic data, the computer program product comprising one or more computer readable storage media collectively having program instructions embodied therewith, the program instructions executable by at least one processor to cause the at least one processor to:
obtain a set of data including candidate geographic data elements;
determine metrics based on a best parent for the candidate geographic data elements, additional non-geographic concepts associated with the candidate geographic data elements from one or more ontologies of the candidate geographic data elements, and an average geographic distance between the candidate geographic data elements, wherein the best parent includes a greatest quantity of parent relationships in a geographic hierarchy with other candidate geographic data elements;
identify the candidate geographic data elements as geographic based on the metrics wherein identifying the candidate geographic data elements includes:
generating a likelihood score based on the best parent, the additional non-geographic concepts, and the average geographic distance between the candidate geographic data elements;
increasing the likelihood score as a number of candidate geographic data elements covered by the best parent increases, as a number of the additional non-geographic concepts decreases, and as the average geographic distance between the candidate geographic data elements decreases; and
identifying the candidate geographic data elements as geographic when the likelihood score exceeds a threshold; and
generate a map displaying the candidate geographic data elements identified as geographic.

16. The computer program product of claim 15, wherein the program instructions to generate the likelihood score further comprise program instructions executable by the at least one processor to cause the at least one processor to:
generate the likelihood score based on an aggregation of a score associated with the best parent, a score associated with the additional non-geographic concepts, and a score associated with the average geographic distance.

17. The computer program product of claim 16, further comprising program instructions executable by the at least one processor to cause the at least one processor to:
determine the score associated with the best parent by analyzing the candidate geographic data elements based on one or more from a group of:
an average distance of the candidate geographic data elements to the best parent;
a number of candidate geographic data elements covered by the best parent; and
a number of candidate geographic data elements included at a same level of the geographic hierarchy under the best parent,
wherein there is a negative correlation between the likelihood score and the average distance of the candidate geographic data elements to the best parent, a positive correlation between the likelihood score and the number of candidate geographic data elements covered by the best parent, and a positive correlation between the likelihood score and the number of candidate geographic data elements included at the same level of the geographic hierarchy under the best parent.

18. The computer program product of claim 16, further comprising program instructions executable by the at least one processor to cause the at least one processor to:
determine the score associated with the additional non-geographic concepts by analyzing a complete ontology of the candidate geographic data elements, wherein there is a negative correlation between the likelihood score and number of additional non-geographic concepts in the complete ontology.

19. The computer program product of claim 16, wherein there is a negative correlation between the likelihood score and the average geographic distance between the candidate geographic data elements.

20. The computer program product of claim 15, wherein data included in the set of data is structured data that does not include an indication as whether the data is geographic data.

* * * * *